(12) United States Patent
Kuk

(10) Patent No.: US 12,400,424 B2
(45) Date of Patent: Aug. 26, 2025

(54) METHOD OF OPC MODELING

(71) Applicant: Samsung Electronics Co., Ltd., Suwon-si (KR)

(72) Inventor: Donghoon Kuk, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 442 days.

(21) Appl. No.: 18/066,714

(22) Filed: Dec. 15, 2022

(65) Prior Publication Data

US 2023/0230346 A1    Jul. 20, 2023

(30) Foreign Application Priority Data

Jan. 20, 2022 (KR) .................. 10-2022-0008352

(51) Int. Cl.
G06V 10/60    (2022.01)
G06V 10/34    (2022.01)
G06V 10/46    (2022.01)

(52) U.S. Cl.
CPC .............. *G06V 10/60* (2022.01); *G06V 10/34* (2022.01); *G06V 10/478* (2022.01)

(58) Field of Classification Search
CPC ...... G06V 10/60; G06V 10/34; G06V 10/478; G03F 1/36; G03F 7/70441; G06F 30/398
USPC ........................................................ 382/190
See application file for complete search history.

(56) References Cited

U.S. PATENT DOCUMENTS 7,449,689 B2 * 11/2008 Nagatomo ................ G03F 1/36
430/5
8,234,601 B2    7/2012 Abdo et al.
8,959,461 B2 *  2/2015 Shibahara ............. H01J 37/261
716/51
9,494,853 B2 * 11/2016 Li ....................... G03F 7/70441
11,048,161 B2    6/2021 Wang et al.
2003/0008215 A1 * 1/2003 Mukherjee .......... G03F 7/70441
430/5
2008/0076047 A1    3/2008 Chun et al.
(Continued)

FOREIGN PATENT DOCUMENTS

KR    100798246 B1    1/2008

OTHER PUBLICATIONS

Yuri Granik et al., "Toward standard process models for OPC," Proceedings of SPIE, vol. 6520 652043-1, Mar. 27, 2007.
(Continued)

*Primary Examiner* — Chineyere Wills-Burns
*Assistant Examiner* — Aaron Timothy Bonansinga
(74) *Attorney, Agent, or Firm* — Harness, Dickey & Pierce, P.L.C.

(57) ABSTRACT

In a method of optical proximity correction (OPC) modeling, a resist image (RI) model is generated from an aerial image (AI) of a pattern. A light intensity of a portion having a level lower than a truncation level is replaced with the truncation level in an image profile of the RI model. The image profile is smoothed to remove a sharp point in the image profile. A Laplacian kernel is applied to the image profile to generate a contour image profile. A portion of the contour image profile having a value lower than a given level is truncated. A radius of curvature kernel is applied to the contour image profile. A reciprocal number of the radius of curvature is applied to the RI model.

20 Claims, 8 Drawing Sheets

(7 of 8 Drawing Sheet(s) Filed in Color)

(56) References Cited

U.S. PATENT DOCUMENTS

| | | | |
|---|---|---|---|
| 2011/0299758 A1* | 12/2011 | Shi | G03F 1/84 |
| | | | 382/144 |
| 2013/0290913 A1* | 10/2013 | Fujimura | H01J 37/3174 |
| | | | 716/53 |
| 2015/0146966 A1* | 5/2015 | Weisbuch | G06T 5/50 |
| | | | 382/145 |
| 2018/0190503 A1* | 7/2018 | Wise | H01L 21/3086 |
| 2021/0294218 A1* | 9/2021 | Fan | G03F 7/70433 |
| 2022/0390832 A1* | 12/2022 | Nath | G03F 7/70441 |

OTHER PUBLICATIONS

Cheng-Huei Lin et al., "OPC model accuracy enhancement for asymmetrical layouts by incorporating 2D contour extraction methodology," Proceedings of SPIE, vol. 10587 105871L-1, Mar. 20, 2018.

Chih-I Wei et al., "Realizing more accurate OPC models by utilizing SEM contours," Proceedings of SPIE, vol. 11325 1132524-1, Mar. 20, 2020.

* cited by examiner

METHOD OF OPC MODELING

CROSS-REFERENCE TO RELATED APPLICATION

This application claims priority under 35 USC § 119 to Korean Patent Application No. 10-2022-0008352, filed on Jan. 20, 2022 in the Korean Intellectual Property Office (KIPO), the contents of which is herein incorporated by reference in its entirety.

BACKGROUND

1. Field

Example embodiments relate to a method of optical proximity correction (OPC) modeling.

2. Description of the Related Art

As the sizes of patterns on wafers decrease, optical proximity effect is intensified during an exposure process, and therefore an optical proximity correction (OPC) for correcting a layout of a pattern drawn in a photomask is beneficial. The OPC includes OPC modeling, correction, and verification, and the OPC modeling includes optical modeling and resist calibration. The resist calibration may be performed precisely if the pattern has a one-dimensional shape, however, the degree of precision has to be enhanced if the pattern has a two-dimensional shape.

SUMMARY

Example embodiments provide a method of OPC modeling.

Example embodiments provide a method of forming a pattern using the method of OPC modeling.

According to example embodiments, there is provided a method of OPC modeling. In the method, a resist image (RI) model may be generated from an aerial image (AI) of a pattern. A light intensity of a portion of an image profile of the RI model having a level lower than a truncation level may be replaced with the truncation level. The image profile may be smoothed such that a sharp point in the image profile is removed. A Laplacian kernel may be applied to the smoothed image profile to generate a contour image profile. A portion of the contour image profile having a value lower than a set level may be truncated. A radius of curvature kernel may be applied to the contour image profile. A reciprocal number of the radius of curvature may be applied to the RI model.

According to example embodiments, there is provided a method of forming a pattern. In the method, a resist image (RI) model may be generated from an aerial image (AI) of a pattern including at least a first line and a second line each extending in a first direction and a third line extending in a second direction such that the third line is connected the first and second lines. A light intensity of a portion of an image profile of the RI model having a level lower than a truncation level may be replaced with the truncation level. The image profile may be smoothed such that a sharp point in the image profile is removed. A Laplacian kernel may be applied to the smoother image profile to generate a contour image profile. A portion of the contour image profile having a value lower than a set level may be truncated. A radius of curvature kernel may be applied to the contour image profile. A reciprocal number of the radius of curvature may be applied to the RI model.

According to example embodiments, there is provided a method of forming a pattern. In the method, a resist image (RI) model may be generated from an aerial image (AI) of a pattern. A light intensity of a portion of an image profile of the RI model having a level lower than a truncation level may be replaced with the truncation level. A Laplacian kernel may be applied to the image profile to generate a contour image profile. A portion of the contour image profile having a value lower than a set level may be truncated. A radius of curvature kernel may be applied to the contour image profile. A reciprocal number of the radius of curvature may be applied to the RI model.

The OPC modeling method in accordance with example embodiments may have a high precision and stability on the pattern having a 2D shape characteristic. If the pattern includes both of the portion having the 1D shape characteristic and the portion of the 2D shape characteristic, the portions may be automatically distinguished to be processes even though an additional decision and/or process are made.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and other aspects will now be described by way of example with reference to the accompanying drawings, of which.

DESCRIPTION OF EMBODIMENTS

Figure 1:
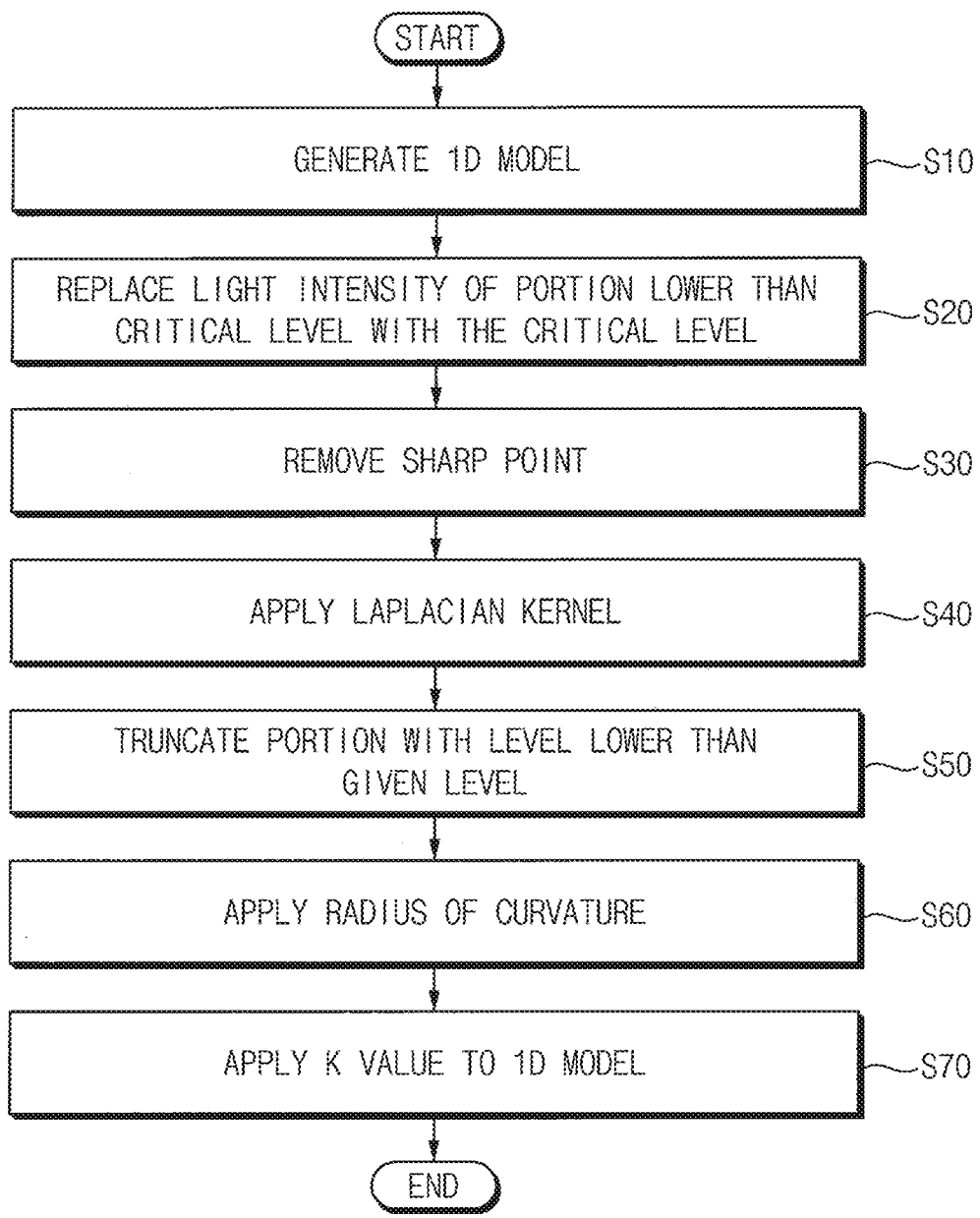
FIG. 1 is a flowchart illustrating an OPC modeling in accordance with example embodiments.

Example embodiments will be more clearly understood from the following detailed description taken in conjunction with the accompanying drawings. It will be understood that, although the terms "first," "second," "third", and/or the like may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second or third element, component, region, layer or section without departing from the teachings of inventive concepts.

When the terms "about" or "substantially" are used in this specification in connection with a numerical value, it is intended that the associated numerical value includes a manufacturing tolerance (e.g., ±10%) around the stated numerical value. Further, regardless of whether numerical values are modified as "about" or "substantially," it will be understood that these values should be construed as including a manufacturing or operational tolerance (e.g., ±10%) around the stated numerical values.

Patterns on a wafer may be formed by forming an etching object layer on the wafer, forming a photoresist layer on the etching object layer, patterning the photoresist layer to form a photoresist pattern, and etching the etching object layer using the photoresist pattern as an etching mask. An etching mask layer may be further formed between the etching object layer and the photoresist layer, and in this case, the etching mask layer may be etched using the photoresist pattern to form an etching mask, and the etching object layer may be etched using the etching mask.

The formation of the photoresist pattern by patterning the photoresist layer may be performed by placing a photomask (e.g., a reticle including a pattern over the photoresist layer), performing an exposure process in which a light is emitted from a light source to penetrate through the photomask, and performing a developing process in which a portion of the photoresist layer exposed or unexposed by the light is removed, so that a layout of the pattern of the photomask may be transferred to the photoresist layer.

In the formation of photoresist patterns deep ultraviolet (DUV) equipment using krypton fluoride (KrF) or argon fluoride (ArF) as a light source has been mainly used, though recently extreme ultraviolet (EUV) equipment has also been used. By using the EUV equipment, patterns having a minute pitch or a curved shape may be easily formed.

As sizes of patterns that may be formed on a wafer decrease, optical proximity effect (OPE) may occur due to the effect of neighboring patterns during the exposure process, and, for example, the proximity of features in the patterns may result in interference and diffraction of light and cause a distorted layout different from the planned layout to be printed on the wafer. Optical proximity correction (OPC), in which layouts of the patterns of a photomask, such as a reticle, may be corrected, may be performed so as to solve the OPE.

The OPC may include OPC modeling, correction, and verification, and the OPC modeling may include optical modeling and resist calibration.

For example, as an exposure process using a photomask including a target pattern that is initially formed is performed, an aerial image (AI) may be generated on a photoresist layer, and a layout of a pattern from the AI may not match a layout of the target pattern due to the optical interaction between a light emitted from a light source and the photomask. Thus, in consideration of the optical interaction, an operation in which an AI model is predicted to be generated from the layout of the target pattern may be referred to as an optical modeling.

After the exposure process, as a developing process is performed on the photoresist layer to form a photoresist pattern, and a resist image (RI) may be generated according to the layout of the photoresist pattern. However, due to additional processing, such as a post exposure baking (PEB) process, and/or physical or chemical interaction between a developing solution and the photoresist layer, the AI may not match the RI. Thus, a process for predicting and generating an RI model from the AI in consideration of the above mismatch is beneficial and may be referred to as resist calibration.

The resist calibration may include a rigorous modeling method in which changes according to the PEB process and the developing process are partially imitated and a compact modeling method in which the physical and chemical interactions are represented by a linear combination through image processing using, e.g., kernel(s) and/or filter(s). In the compact modeling method, an OPC modeling has been developed to have a high level of prediction and coherence in a case in which a layout of a pattern has a one-dimensional (1D) shape, e.g., line and space. However, there is no appropriate OPC modeling for an end-of-line (EOL) or for a two-dimensional (2D) shape (e.g., in which the lines are connected with each other).

Hereinafter, in example embodiments, an OPC modeling having a high precision and stability even for the EOL and/or the two-dimensional shape is described, and particularly, resist calibration by a compact modeling method included in the OPC modeling is explained.

Figure 2:
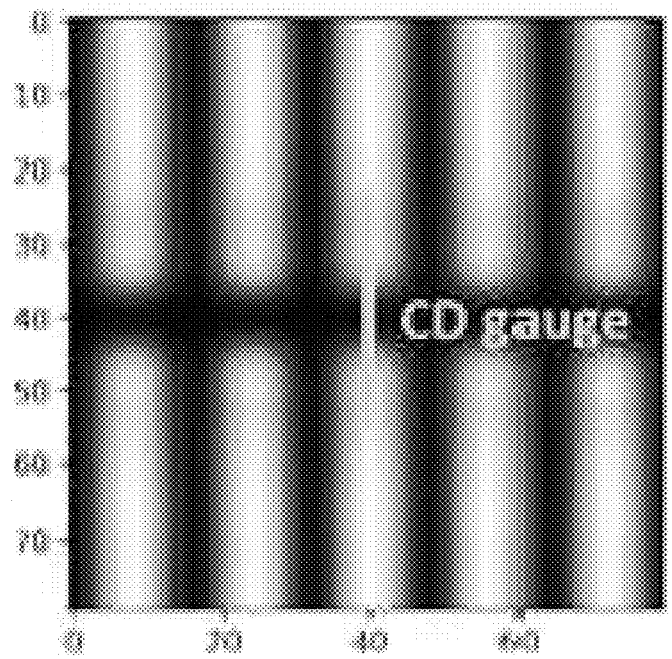
FIG. 2 is an RI used in the OPC modeling.

FIG. 1 is a flowchart illustrating an OPC modeling in accordance with some example embodiments, FIG. 2 is an RI used in the OPC modeling, and FIGS. 3 to 6 are graphs represented by a light intensity according to positions of an image profile included in the RI, which are image profiles of a region represented by CD gauge in FIG. 2.

In at least one embodiment, the steps of FIG. 1 may be implemented by processing circuitry such as hardware, software, or a combination thereof configured to perform a specific function. For example, the processing circuity more specifically may include (and/or be included in), but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc. The steps can be implemented in the feature selection and extraction of an RI, thereby identifying features of a pattern in preparation for a classification operation using, e.g., machine learning.

Herein, the machine learning model may have any structure that is trainable, e.g., with training data. For example, the machine learning model may include an artificial neural network, a decision tree, a support vector machine, a Bayesian network, a genetic algorithm, and/or the like. The machine learning model will now be described by mainly referring to an artificial neural network, but the example embodiments are not limited thereto. Non-limiting examples of the artificial neural network may include a convolution neural network (CNN), a region based convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, and/or the like. Herein, the machine learning is used to predict and/or classify defects in a pattern and/or may be used to correct the pattern. For example, in some example embodiments, the classification of the pattern may be used to identify areas of the pattern prone to OPE based defects, e.g., where the critical dimensions of the pattern are too small and/or where features of the pattern are too close.

For example, in some example embodiments, the classification may be used to predict and/or identify a pattern distortion caused by, e.g., OPE. For example, neighboring tip-to-line may cause a bridge to form between neighboring lines due to, e.g., pattern distortions in neighboring lines and, in these cases, the pattern may be corrected by adjusting the location of the tips of the lines accordingly. The machine learning can be used, for example, to determine a level of adjustment such that the likelihood of OPE based defects is below a threshold. In at least one example embodiment, the machine learning can participate in the control an apparatus configured to produce the wafer and/or photomask based on whether the design has been confirmed, modified, and/or rejected. For example, in some example embodiments, a layout and/or process may be confirmed based on the predictions and/or classifications produced through machine learning, thereby indicating that the layout and/or process is verified to proceed to manufacture, and/or the process may be paused (and/or stopped) if the machine learning identifies defects beyond an acceptable threshold and/or that would result in a deterioration below an acceptable threshold value. In at least one embodiment, e.g., wherein the machine learning identifies a defect, the photomask may be reprocessed, if the defect can be corrected, or discarded if the defect cannot be corrected.

Referring to FIGS. 1 and 2, in step S10, resist calibration may be performed on a pattern having a 1D shape, e.g., line and space to generate an RI model (1D model).

If the RI model has a sufficiently high precision degree, even for an EOL of a pattern having a 1D shape or a 2D shape, the OPC modeling may be finished by generating the 1D model with no additional process, however, if the RI model does not have a sufficiently high precision degree, step S20 may be performed.

Figure 3:
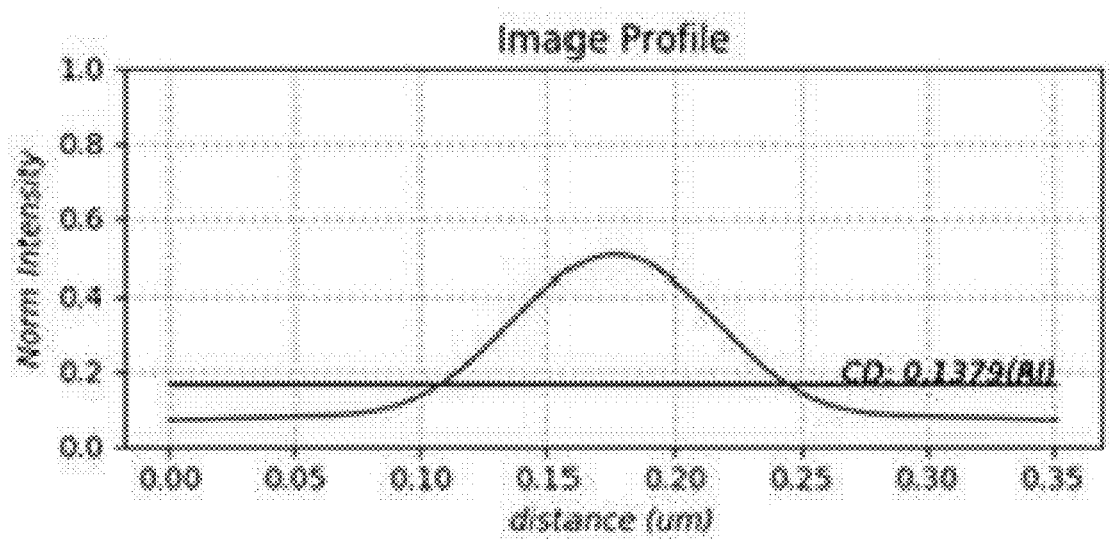
FIGS. 3 to 6 are graphs represented by a light intensity according to positions of an image profile included in the RI, which are image profiles of a region represented by CD gauge in FIG. 2.

Referring to FIGS. 1 and 3, in step S20, a portion of an image profile of the generated RI model that has a light intensity lower than a truncation level may be truncated, and the portion of the image profile having the light intensity lower than the truncation level may be replaced with a critical level.

For example, the truncation may be performed using a truncation kernel represented by the following mathematical equation, wherein x is a light intensity.

$$f(x) = \max(x, \text{truncation level})$$

For example, a function having an output that is higher between the light intensity and the truncation level at each position of the image profile may be generated, and thus a central portion of the image profile having a relatively high light intensity may remain while each of opposite edge portions of the image profile having a relatively low light intensity may be transformed into a line having the truncation level. A level having a critical value in the image profile may be selected as the truncation level, and thus the truncation level may also be referred to as a threshold level.

Figure 4:
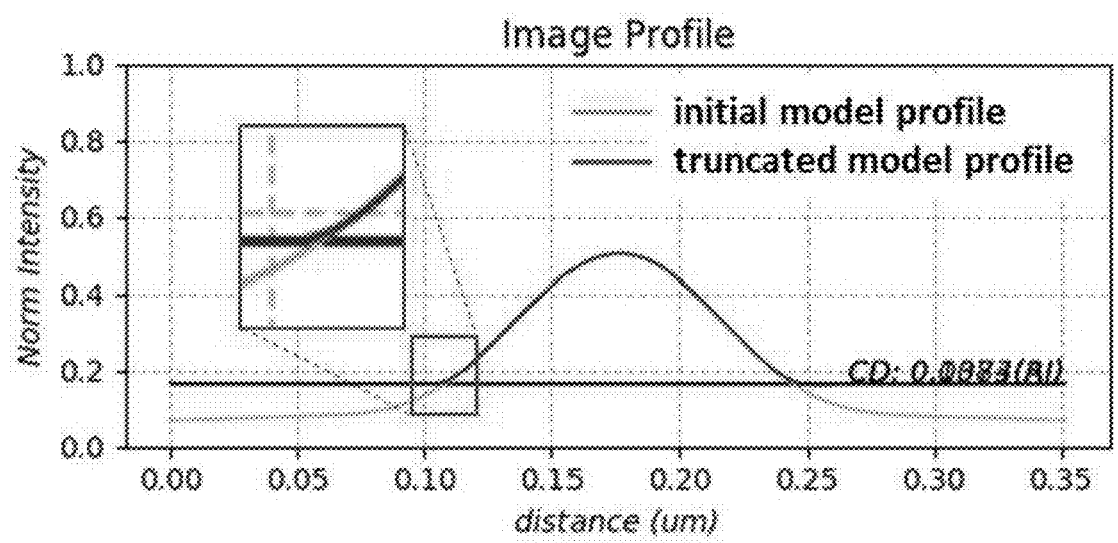

Referring to FIGS. 1 and 4, in step S30, a sharp point may be generated at an interface between the central portion and each edge portion due to the truncation, and the function may diverge at the sharp point if the function is differentiated. Thus, a rectification in which the sharp point may be smoothed may be performed so that the function may be differentiable at all points.

The rectification may be performed on a function generated by the step 20 using a rectification kernel (e.g., a softplus function) represented by the following mathematical equation, wherein x is a light intensity (e.g., a result of the truncation kernel represented above) and k is a constant.

$$f(x) = \frac{\ln(1 + e^{kx})}{k}$$

By the rectification kernel, the sharp point may be removed from the image profile, and the image profile may have a curved shape at an entire portion.

Figure 5:
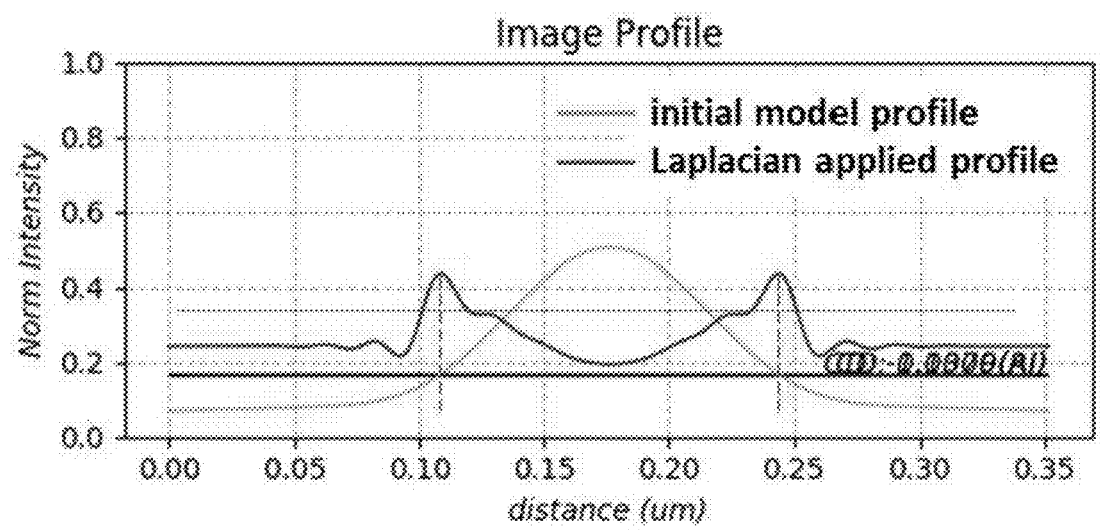

Referring to FIGS. 1 and 5, in step S40, a convolution calculation may be performed on a Laplacian kernel and a function generated by the step S30 to generate a contour of the image profile.

The Laplacian kernel may be represented by, for example, the following mathematical equation.

$$\Delta f = \nabla^2 f = \nabla \cdot \nabla f = \sum_{i=1}^{n} \frac{\partial^2 f}{\partial x_i^2}$$

By applying the Laplacian kernel, the image profile may be transformed into a contour image profile in which a portion having a level close to the critical level, before the truncation in the step S20, may have a level higher than levels of other portions.

Figure 6:
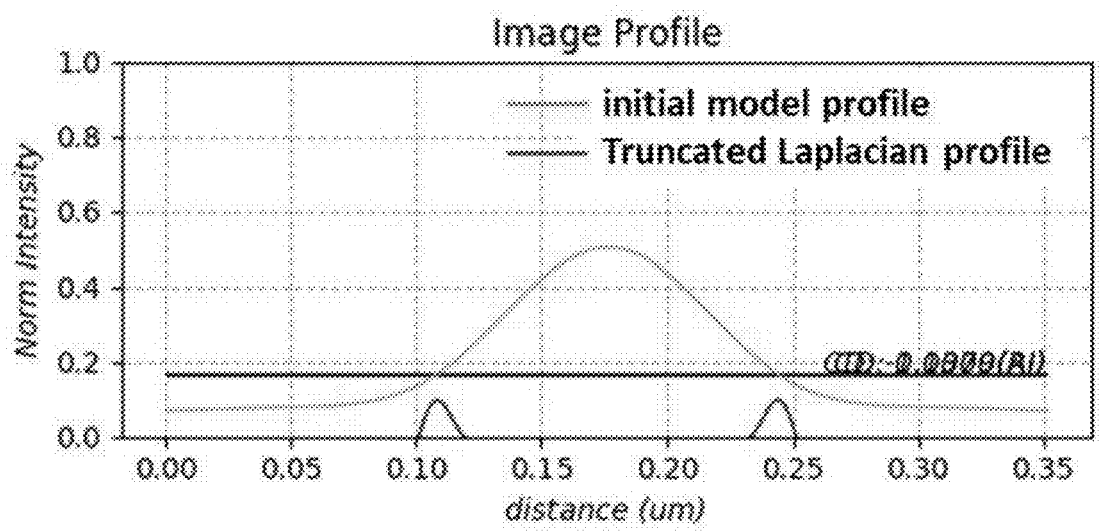

Referring to FIGS. 1 and 6, in step S50, a truncation kernel, which may be similar to that of the step S30, may be used so that a portion having a given (or set) level (e.g., a negative level less than zero) may be removed and a portion having a level equal to or more than the given level (e.g., zero or a positive level) may remain in the contour image profile generated by the step S40.

After the truncation, only a portion having a value close to the critical level in the contour image profile may remain.

Referring to FIG. 1, in step S60, a convolution calculation may be performed on a radius of curvature (R) kernel and a function generated by the step S50 to generate a radius of curvature (R), and k value that is a reciprocal number of the radius of curvature (R) may be calculated. The k value may be calculated by the following mathematical equation, where x and y are plane coordinate at each position.

$$k = \frac{1}{R} = -\frac{\begin{pmatrix} -F_y & F_x \end{pmatrix} \begin{pmatrix} F_{xx} & F_{xy} \\ F_{yx} & F_{yy} \end{pmatrix} \begin{pmatrix} -F_y \\ F_x \end{pmatrix}}{(F_x^2 + F_y^2)^{3/2}} = \left| \frac{F_y^2 F_{xx} - 2F_x F_y F_{xy} + F_x^2 F_{yy}}{(F_x^2 + F_y^2)^{3/2}} \right|$$

where $F_x = \partial_x f(x, y)$, $F_{xx} = \partial_{xx} f(x, y) = \partial_x^2 f(x, y)$ An EOL of each line in the RI may have different radii of curvature at positions thereof, and thus may have different k values. However, the example embodiments are not limited thereto, and a sidewall of each line may have an infinite radius of curvature, so that the k value may be zero.

Figure 7:
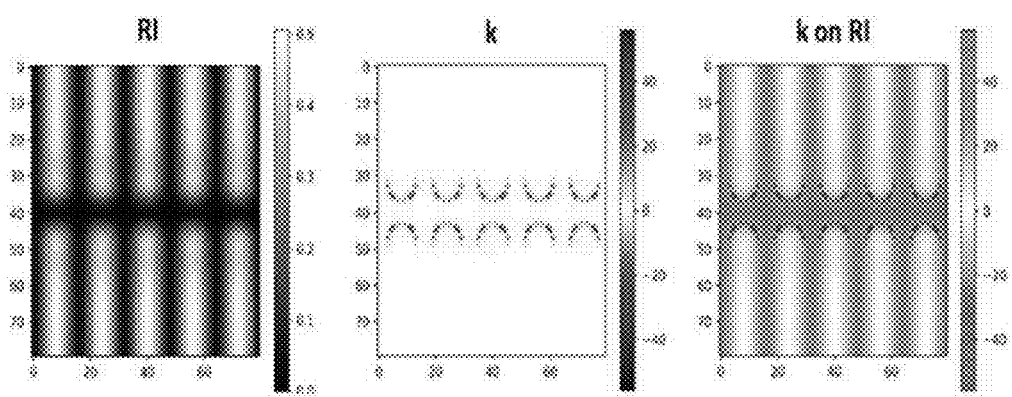
FIG. 7 is an image in which k values are shown at each position of the RI.

FIG. 7 is an image in which k values are shown at each position of the RI.

Referring to FIG. 7, the k value of the sidewall is zero, and thus is not shown, while the k values of the EOL are various along the contour.

By the steps S20 to S60, the Laplacian kernel may be applied to the initially generated 1D RI model to extract the contour, the radius of curvature (R) and the k value may be calculated along the contour. Additionally, the truncation in which the portion having the value less than the critical value is truncated may be performed so that the k value may be calculated at a required portion, and the rectification may be performed so that the divergence may be prevented during the differentiation of the function to which the Laplacian kernel is applied.

The k value may be zero or very close to zero at a most portion in the 1D shape, while the k value may not be zero at the EOL or a portion having a 2D shape. Thus, the most portion of the 1D shape except for the EOL or the portion having the 2D shape may be filtered during the generation of the k value. For example, a region to which the steps S20 to S60 may not be deliberately designated, and the regions may be automatically classified according to the k value generated by the steps S20 to S60.

Accordingly, the steps S20 to S60 may be appreciated as a process for recognition of a 2D shape (and/or an EOL of a 1D shape).

Figure 8:
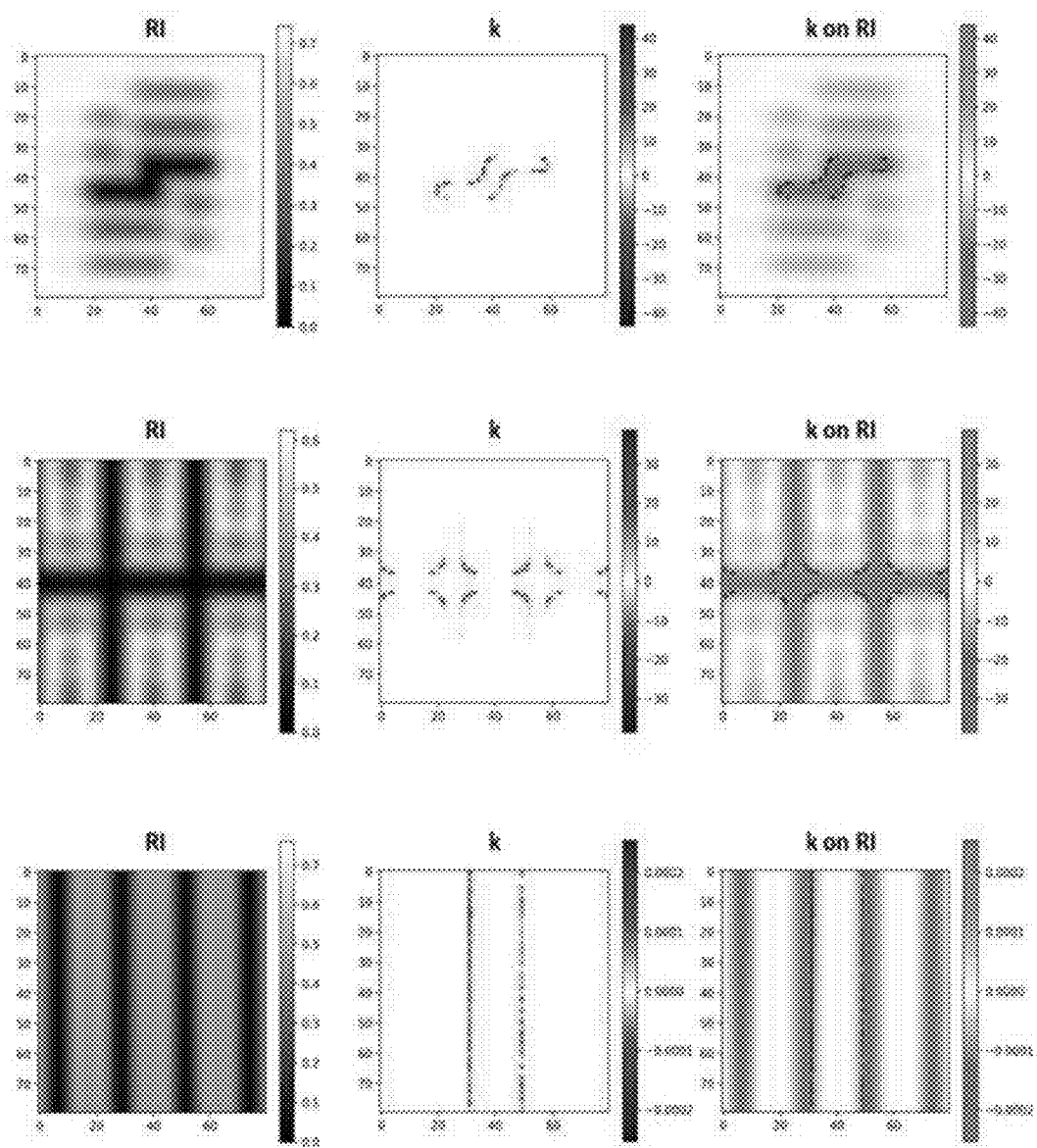
FIG. 8 illustrates k values at various RI having various shapes.

FIG. 8 illustrates k values at various RI having various shapes.

As illustrated above, a k value at a sidewall of each line, that is, a portion having a 1D shape characteristic is zero or very close to zero, while k values at an EOL of each line, or a portion contacting neighboring lines, that is, a portion having a 2D shape characteristic are various.

For example, if a pattern includes first and second lines each of which extends in a first direction and a third line extending in a second direction crossing the first direction and connected to the first and second lines, the k value is substantially zero (e.g., zero or very close to zero) at a sidewall of each of the first and second lines, and is greater than zero at a portion of the third line contacting the first line or the second line.

In example embodiments, the k value having the 2D shape characteristic may be approximately $10^5$ of the k value having the 1D shape characteristic.

Referring to FIG. 1, in step S70, the k value calculated by the step S60 may be additionally applied to the initial 1D model, so that the initial 1D model may be modified.

As illustrated above, the k value may have no influence on the portion having the 1D shape characteristic except for the EOL of the 1D shape or the portion having the 2D shape characteristic, and thus the modified 1D model may maintain the precision and stability of the initial 1D model and may have enhanced precision and stability of the EOL of the 1D shape or the portion having the 2D shape characteristic.

If required, when the k value is applied to the 1D model, optimization for coefficients may be further performed.

If the modified 1D model is determined as having a sufficient precision, the OPC modeling may be finished, and thus a final OPC model may be generated. If the modified 1D model is not determined as having the sufficient precision, the above steps S20 to S70 may be repeatedly performed.

As illustrated above, in the OPC modeling method in accordance with example embodiments, even though an independent decision on the EOL of the 1D shape or the portion having the 2D shape characteristic is not made in addition to the portion having the 1D shape characteristic, the portions may be automatically distinguished by the calculation of the k value. Thus, the OPC modeling method may also be applied to an OPC modeling method based on machine learning, thereby approving the precision of the OPC modeled using machine learning.

The OPC modeling method may be applied to a method of forming a pattern including a portion having a 2D shape characteristic as well as a portion having a 1D shape characteristic, and a method of manufacturing various devices including the pattern.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concepts as defined in the claims.

In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An optical proximity correction (OPC) method comprising:
generating a resist image (RI) model from an aerial image (AI) of a pattern;
replacing a light intensity of a portion of an image profile of the RI model, the portion having a level lower than a truncation level, with the truncation level;
smoothing the image profile such that a sharp point in the image profile is removed;
applying a Laplacian kernel to the smoothed image profile to generate a contour image profile;
truncating a portion of the contour image profile having a value lower than a set level;
applying a radius of curvature kernel to the contour image profile; and
applying a reciprocal number of the radius of curvature to the RI model.

2. The method of claim 1, wherein replacing the light intensity of the portion having the level lower than the truncation level includes using a truncation kernel represented by $$f(x) = \max(x, \text{truncation level})$$

wherein x is the light intensity.

3. The method of claim 2, wherein smoothing the image profile includes using a rectification kernel represented by $$f(x') = \frac{\ln(1 + e^{kx'})}{k}$$

wherein x' is a result after the application of the truncation kernel and k is a constant.

4. The method of claim 3, wherein the Laplacian kernel is represented by $$\Delta f = \nabla^2 f = \nabla \cdot \nabla f = \sum_{i=1}^{n} \frac{\partial^2 f}{\partial x_i^2}$$

wherein f is a result after the application of the rectification kernel.

5. The method of claim 4, wherein the set level is zero such that truncating the portion of the contour image profile includes truncating a portion having a negative value after the application of the Laplacian kernel.

6. The method of claim 1, wherein the radius of kernel is represented by $$\frac{1}{R} = -\frac{\begin{pmatrix} -F_y & F_x \end{pmatrix} \begin{pmatrix} F_{xx} & F_{xy} \\ F_{yx} & F_{yy} \end{pmatrix} \begin{pmatrix} -F_y \\ F_x \end{pmatrix}}{(F_x^2 + F_y^2)^{3/2}} = \left| \frac{F_y^2 F_{xx} - 2F_x F_y F_{xy} + F_x^2 F_{yy}}{(F_x^2 + F_y^2)^{3/2}} \right|$$

where $F_x = \partial_x f(x, y)$, $F_{xx} = \partial_{xx} f(x, y) = \partial_x^2 f(x, y)$ wherein x and y are plane coordinates, and f(x, y) is a result after the application of the Laplacian kernel at each position.

7. The method of claim 1, wherein the pattern includes a shape of a line extending in a direction, and
wherein the reciprocal number of the radius of curvature is substantially zero at a sidewall of the line and is greater than zero at an end of line (EOL) of the line.

8. The method of claim 1, wherein the pattern includes a first line and a second line each extending in a first direction, and a third line extending in a second direction such that the third line is connected to the first and second lines, and
wherein the reciprocal number is substantially zero at a sidewall of each of the first and second lines and is greater than zero at a portion of the third line contacting at least one of the first line or the second line.

9. An optical proximity correction (OPC) method comprising:
generating a resist image (RI) model from an aerial image (AI) of a pattern, the pattern including, at least, a first line and a second line each extending in a first direction and a third line extending in a second direction such that the third line is connected to the first and second lines;
replacing a light intensity of a portion of an image profile of the RI model, the portion having a level lower than a truncation level, with the truncation level;
smoothing the image profile such that a sharp point in the image profile is removed;
applying a Laplacian kernel to the smoothed image profile to generate a contour image profile;
truncating a portion of the contour image profile having a value lower than a set level;
applying a radius of curvature kernel to the contour image profile; and
applying a reciprocal number of the radius of curvature to the RI model.

10. The method of claim 9, wherein replacing the light intensity of the portion having the level lower than the truncation level includes using a truncation kernel represented by $$f(x) = \max(x, \text{truncation level})$$

wherein x is the light intensity.

11. The method of claim 10, wherein smoothing the image profile includes using a rectification kernel represented by $$f(x') = \frac{\ln(1 + e^{kx'})}{k}$$

wherein x' is a result after the application of the truncation kernel, and k is a constant.

12. The method of claim 11, wherein the Laplacian kernel is represented by $$\Delta f = \nabla^2 f = \nabla \cdot \nabla f = \sum_{i=1}^{n} \frac{\partial^2 f}{\partial x_i^2}$$

wherein f is a result after the application of the rectification kernel.

13. The method of claim 12, wherein the set level is zero such that truncating the portion of the contour image profile includes truncating a portion having a negative value after the application of the Laplacian kernel.

14. The method of claim 9, wherein the radius of kernel is represented by, $$\frac{1}{R} = -\frac{\begin{pmatrix} -F_y & F_x \end{pmatrix} \begin{pmatrix} F_{xx} & F_{xy} \\ F_{yx} & F_{yy} \end{pmatrix} \begin{pmatrix} -F_y \\ F_x \end{pmatrix}}{(F_x^2 + F_y^2)^{3/2}} = \left| \frac{F_y^2 F_{xx} - 2F_x F_y F_{xy} + F_x^2 F_{yy}}{(F_x^2 + F_y^2)^{3/2}} \right|$$

where $F_x = \partial_x f(x, y)$, $F_{xx} = \partial_{xx} f(x, y) = \partial_x^2 f(x, y)$ x and y are plane coordinates, and f(x, y) is a result after the application of the Laplacian kernel at each position.

15. The method of claim 9, wherein the reciprocal number is substantially zero at a sidewall of each of the first and second lines and is greater than zero at a portion of the third line contacting at least one of the first line or the second line.

16. The method of claim 9, wherein the reciprocal number of the radius of curvature is zero or close to zero at a sidewall of each of the first and second lines and is greater than zero at an end of line (EOL) of each of the first and second lines.

17. An OPC method comprising:
generating a resist image (RI) model from an aerial image (AI) of a pattern;
replacing a light intensity of a portion of an image profile of the RI model, the portion having a level lower than a truncation level, with the truncation level;
applying a Laplacian kernel to the image profile to generate a contour image profile;
truncating a portion of the contour image profile having a value lower than a set level;
applying a radius of curvature kernel to the contour image profile; and
applying a reciprocal number of the radius of curvature to the RI model.

18. The method of claim 17, further comprising:
after replacing the light intensity of the portion having the level lower than the truncation level, smoothing the image profile such that a sharp point in the image profile is removed.

19. The method of claim 18, wherein smoothing the image profile to remove the sharp point in the image profile includes using a rectification kernel represented by $$f(x') = \frac{\ln(1 + e^{kx'})}{k}$$

wherein x' is a result after the application of the truncation kernel and k is a constant.

20. The method of claim 17, wherein replacing the light intensity of the portion having the level lower than the truncation level includes using a truncation kernel represented by $$f(x) = \max(x, \text{truncation level})$$

wherein x is a light intensity.

* * * * *